United States Patent [19]
Kazino et al.

[11] Patent Number: 5,558,480
[45] Date of Patent: Sep. 24, 1996

[54] BOLT FOR TRUSS, WHEREIN THE BOLT HAS SHAFT PORTIONS SEPARATED BY A GROOVE AND A STOPPER HAVING PROTRUSIONS ENGAGED IN THE GROOVE

[75] Inventors: Hiroshi Kazino; Masaaki Ide; Shinichi Kondo; Tomiyasu Kakeno, all of Aichi-ken, Japan

[73] Assignee: Aoyama Seisakusho Co., Ltd., Aichi-ken, Japan

[21] Appl. No.: 369,904

[22] Filed: Jan. 9, 1995

[30] Foreign Application Priority Data

Jan. 20, 1994  [JP]  Japan .................... 6-004483

[51] Int. Cl.⁶ .................................... F16B 35/02
[52] U.S. Cl. .................. 411/368; 411/353; 411/383; 411/999
[58] Field of Search .................. 411/353, 368, 411/383, 389, 396, 402, 533, 546, 919, 999

[56] References Cited

U.S. PATENT DOCUMENTS

| 1,172,644 | 2/1916 | Trester | 411/368 |
|---|---|---|---|
| 1,335,613 | 3/1920 | Selle | 411/368 |
| 3,368,602 | 2/1968 | Boyd | 411/999 |
| 3,418,869 | 12/1968 | Herpich | 411/546 |
| 4,729,707 | 3/1988 | Takahashi | 411/389 |
| 5,026,233 | 6/1991 | Carothers | 411/353 |
| 5,059,075 | 10/1991 | Kelly | 411/999 |

FOREIGN PATENT DOCUMENTS 3864555  8/1989  Germany .................... 411/533

*Primary Examiner*—Flemming Saether
*Attorney, Agent, or Firm*—Frishauf, Holtz, Goodman, Langer & Chick

[57] ABSTRACT

A bolt for a truss includes a main body having a head portion, and a shaft portion which extends from the head portion. The shaft portion includes a base portion with a polygonal cross-section at a head portion side of the shaft portion. A threaded portion extends from the base portion, and an annular groove is arranged between the base portion and the threaded portion. A polygonal tube having a polygonal cross-section is engaged with the shaft portion of the main body such that the polygonal tube is slideable and non-rotatable on the base portion. A stopper prevents release of the polygonal tube from the shaft portion, the stopper including a plastic ring having a peripheral surface on which plural engaging protrusions are formed, the ring being integratedly embedded in the annular groove.

1 Claim, 3 Drawing Sheets

BOLT FOR TRUSS, WHEREIN THE BOLT HAS SHAFT PORTIONS SEPARATED BY A GROOVE AND A STOPPER HAVING PROTRUSIONS ENGAGED IN THE GROOVE

BACKGROUND OF THE INVENTION

This invention relates to a bolt for a truss to be used when plural pipes for structural purposes are connected to a member for constructing a truss.

As shown in FIG. 6, a conventional bolt for a truss to be used when plural pipes for structural purposes are connected to a member used in the construction of the truss, comprises a main body 21 in which a threaded shaft portion 24 is formed at the end of a shaft portion 23. A head portion 22 is formed at the other end thereof and a pin hole 20 is pierced in the middle of the shaft portion 23; a polygonal tube 26 having a slotted hole 28 in a body thereof is slidably engaged with the shaft portion 23; and a pin 25 connects the polygonal tube 26 to the shaft portion 23. When a pipe 31 for structural purposes is connected to a member 27 for constructing a truss, a sleeve 32 welded to the end of the pipe 31 for structural purposes is engaged with a lower collar portion of the shaft portion 23; the polygonal tube 26 is engaged from the shaft end of the shaft portion 23; the pin 25 is inserted into the pin hole 20 through the slotted hole 28; and then the polygonal tube 26 is rotated, whereby the main body 21 is rotated to insert the threaded shaft portion 24 into a tapped hole 29 of the member 27 for constructing a truss by screwing.

Since the polygonal tube 26 and the main body 21 are slidably connected by restricting rotation by the pin 25, the pin hole 20 of the shaft portion 23 and the slotted hole 28 of the polygonal tube 26 are required, whereby there are problems that mechanical strength of the main body 21 and the polygonal tube 26 is lowered and corrosion resistance is also lowered by a drilling and there is a problem of an increase in cost caused by a step of a drilling.

SUMMARY OF THE INVENTION

An object of the present invention is to provide a bolt for a truss which can solve the problems described above, does not lower strength and corrosion resistance and also is inexpensive.

The bolt for a truss of the present invention which can solve the problems described above comprises:

a main body having a head portion and a shaft portion which leads to the head portion and has a base shaft portion with an a polygonal section at a head portion side and a threaded shaft portion leading to the base shaft portion; and a polygonal tube which is engaged with the shaft portion of the main body and can be slid on the base shaft portion, but cannot be rotated around the base shaft portion.

DESCRIPTION OF THE PREFERRED EMBODIMENTS

Figure 1:
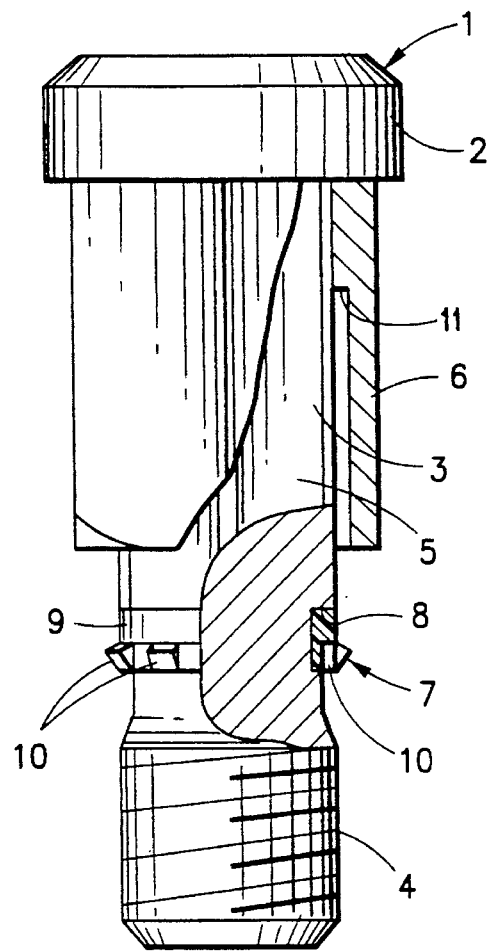
FIG. 1 is a partially cut front view showing one example of the present invention.

In the following, the present invention is explained in detail.

In the bolt for a truss of the present invention, a sleeve to be welded to the end of a pipe for structural purposes is engaged with a lower collar portion of a shaft portion; the sleeve is welded to the end of the pipe for structural purposes; a polygonal tube is engaged from the shaft end of the shaft portion; the polygonal tube is inserted at a sleeve side to be shifted to a base shaft portion with a polygonal section located at a head portion side; the main body is rotated by rotating the polygonal tube; a threaded shaft portion is inserted into a tapped hole of a member for constructing a truss by screwing, whereby a truss in which the pipe for structural purposes is connected with and fixed to the member for constructing a truss with the main body.

EXAMPLES

The present invention is described in detail by referring to one example shown in the drawings.

Figure 2:
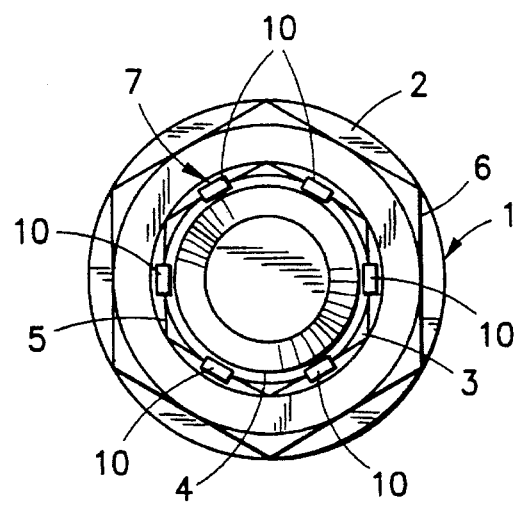
FIG. 2 is a bottom view showing one example of the present invention.
Figure 3:
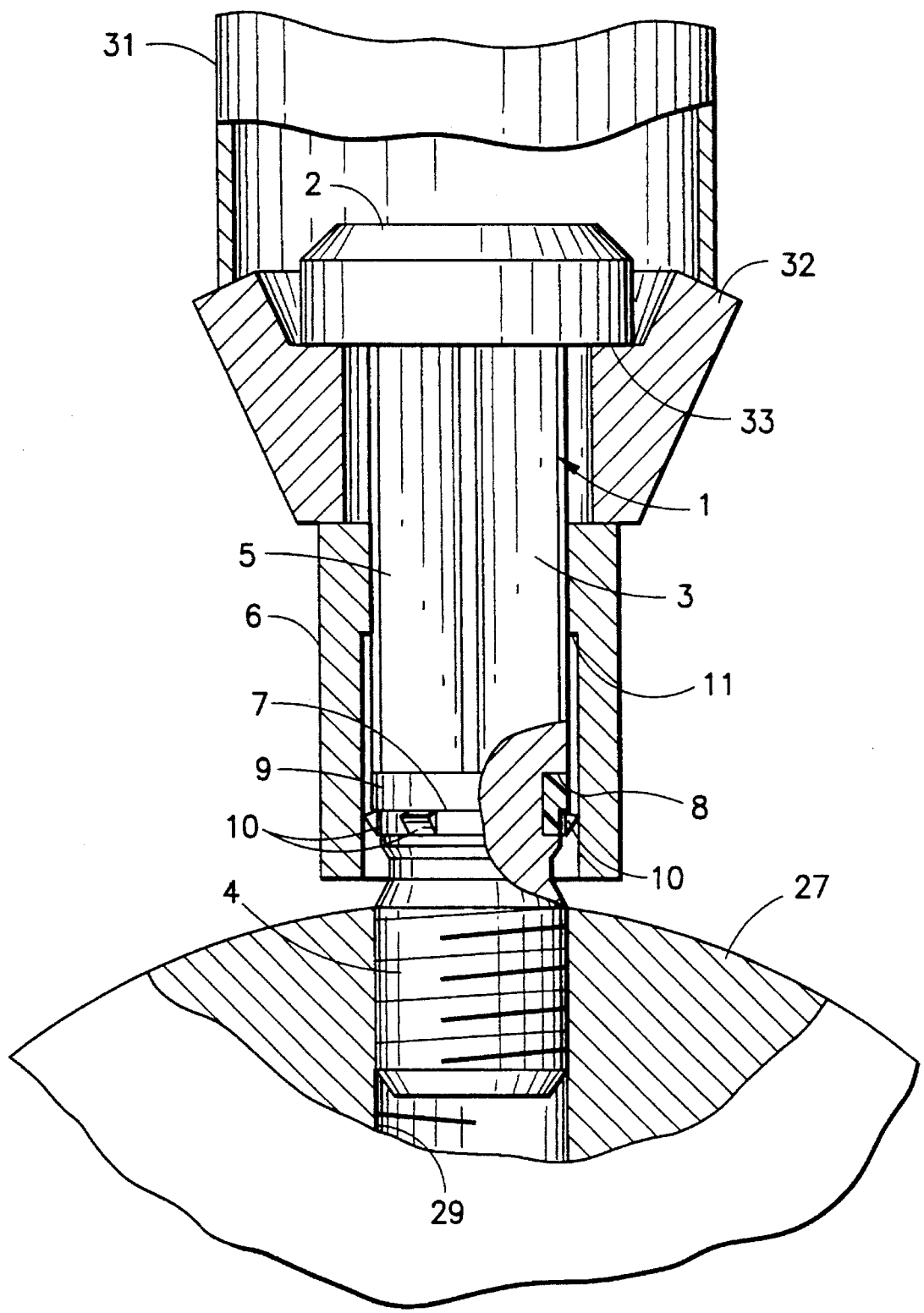
FIG. 3 is a partially cut side view showing a state of using one example of the present invention.

As shown in FIGS. 1–3, 1 is a main body having a head portion 2 formed at a base portion thereof. In a shaft portion 3 of the main body 1, a threaded shaft portion 4 is formed at an end portion thereof, and a base shaft portion 5 with an a polygonal section such as a hexagonal section or a square section having a diameter larger than a thread outer diameter of the threaded shaft portion is formed at a head portion side.

6 is a polygonal tube. The polygonal tube 6 is engaged with the shaft portion 3 and can be slid on the base shaft portion 5, but cannot be rotated around the base shaft portion 5. A major portion of the inner surface of the polygonal tube 6 is larger than a thread outer diameter of the threaded shaft portion 4. A part of the inner surface of the polygonal tube 6 at a head portion side has an inner surface having a polygonal section which is the same as the section of the base shaft portion 5; also the outer surface of the polygonal tube 6 has a polygonal section which is the same as the section of the base shaft portion 5 so that a tool such as a spanner and a wrench can be engaged therewith.

7 is a stopper for preventing release of the polygonal tube 6 and is formed in the middle of the shaft portion 3. The stopper 7 shown in the example comprises a plastic ring 9 having a peripheral surface on which plural engaging protrusions 10 are formed being integratedly embedded in a circular concave groove 8 formed in the middle of the shaft portion 3, according to an insert molding method. The engaging protrusions 10 of the stopper 7 are contacted with an inner collar portion 11 formed on the inner surface of the polygonal tube 6 at a head portion side so that the polygonal tube 6 is cannot drop or be disengaged from the shaft portion 3.

In the bolt constituted as described above, the shaft portion 3 of the main body 1 is engaged with a sleeve 32 to be welded to the end of a pipe 31 for structural purposes, and the head portion 2 is engaged with a receiving step portion 33 which is at the base end of the sleeve 32. Then, the polygonal tube 6 with a hexagonal section is engaged with the end of the shaft portion 3 projected outward from the sleeve 32. The polygonal tube 6 can be easily shifted to a predetermined position by sliding the polygonal tube 6 along the base shaft portion 5 with a hexagonal section until one end of the angular tube 6 climbs over the stopper 7 and reaches the sleeve 32, since the polygonal tube 6 can be slid on the shaft portion 3 of the main body 1, but cannot be rotated around said portion. Next, by engaging a tool for rotation such as a spanner and a wrench with the outer surface of the polygonal tube 6 and rotating the polygonal tube 6 thereby, the main body 1 is rotated by the polygonal tube 6 which cannot be rotated around the shaft portion 3 of the main body 1, whereby the threaded shaft portion 4 is inserted into a tapped hole 29 of a member 27 for constructing a truss by screwing. When the main body 1 is rotated by rotating the polygonal tube 6 by a tool for rotation as described above, as the threaded shaft portion 4 is inserted into the tapped hole 29 by screwing, the positions of the polygonal tube 6 and the main body 1 are shifted. However, since the polygonal tube 6 can be slid on the base shaft portion 5, but cannot be rotated around said portion, rotation of the polygonal tube 6 is securely transmitted to the main body 1 until fastening is finished. When fixing by screwing is completed as described above, the pipe 31 for structural purposes is connected with and fixed to the member 27 for constructing a truss by the main body 1 fitted with the sleeve 32, whereby a truss is constructed.

Figure 4:
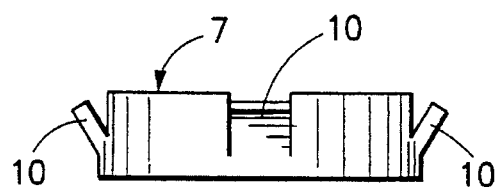
FIG. 4 is a front view showing another example of the stopper used in the present invention.
Figure 5:
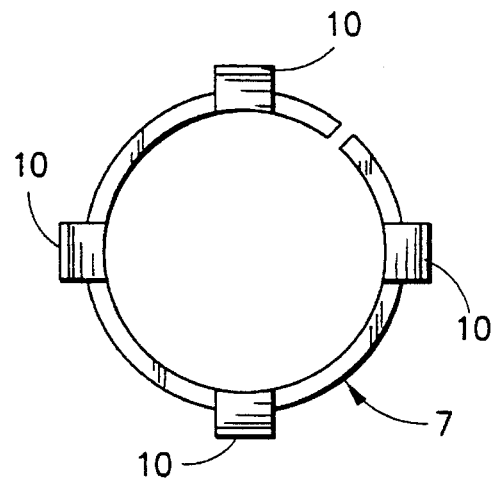
FIG. 5 is a plane view of the stopper shown in FIG. 4.
Figure 6:
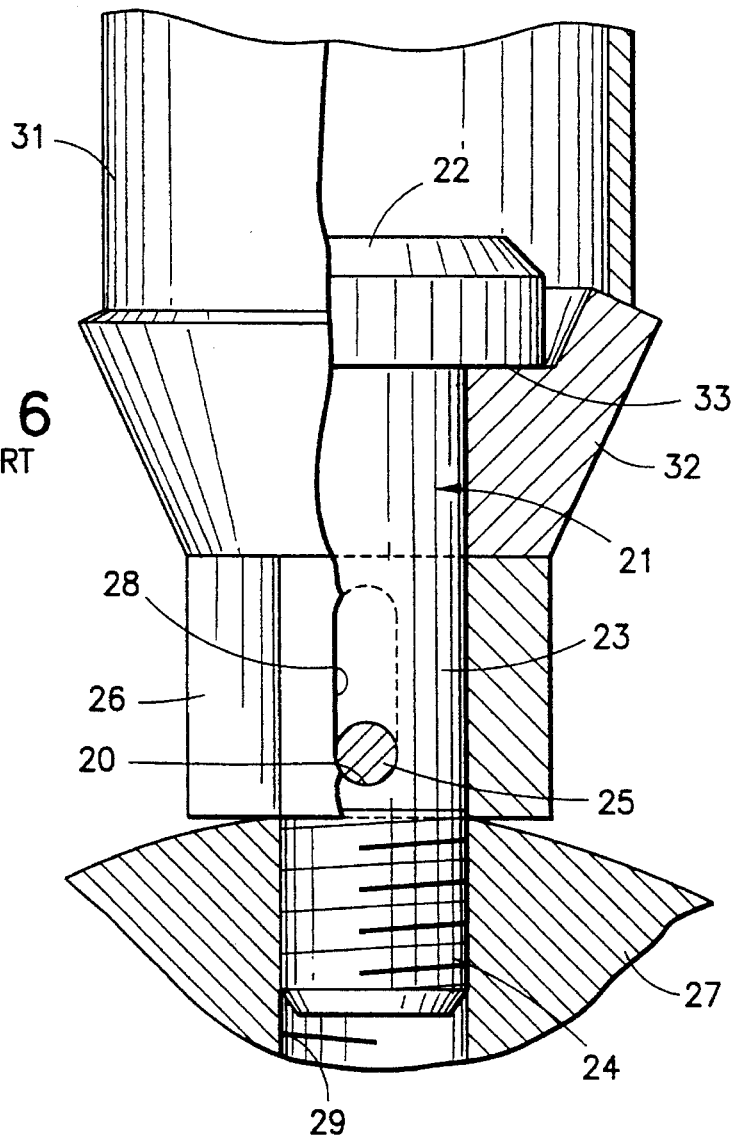
FIG. 6 is a partially cut side view showing a state of connection by a conventional bolt for a truss.

The stopper 7 is not necessarily required since it is used for maintaining a state that the polygonal tube 6 is engaged with the main body 1. However, it is preferred to provide the stopper 7 for preventing release of the polygonal tube 6 on the shaft portion 3 since operatability is good because a state that the polygonal tube 6 is engaged can be maintained. The structure of the stopper 7 is not particularly limited so long as it has a function of maintaining a state that the polygonal tube 6 is engaged with the main body 1. However, particularly preferred is a stopper in which the circular concave groove 8 is formed between the base shaft portion 5 and the threaded shaft portion 4 of the shaft portion 3; and the plastic ring 9 having a peripheral surface on which the plural engaging protrusions 10 are formed is integratedly embedded in the circular concave groove 8 according to an insert molding method, since said stopper can be prepared easily and also installing, removing and maintaining of the polygonal tube 6 can be carried out accurately. In order to impart more excellent durability to the stopper 7, as shown in FIG. 4 and FIG. 5, a thin plate made of a metal is bent so as to be circular and then cut and raised to provide the plural engaging protrusions 10, and the stopper 7 obtained is engaged with the circular concave groove 8. Further, from the points of corrosion resistance and spring property, a stainless steel (SUS 304) is preferred.

As can be clearly understood from the above description, the bolt for a truss of the present invention comprises a main body having a shaft portion which has a base shaft portion with a polygonal section at a head portion side and a threaded shaft portion leading to the base shaft portion; and a polygonal tube which is engaged with the shaft portion of the main body and can be slid on the base shaft portion, but cannot be rotated around said portion. Therefore, it is not required to connect the shaft portion and the polygonal tube with a pin by providing a pin hole piercing the shaft portion and forming a slotted hole in the polygonal tube, so that the bolt for a truss of the present invention has many advantages that there is no lowering of strength of the main body and the polygonal tube which has been caused by providing a pin hole and a slotted hole and also a processing of making holes such as a pin hole and a slotted hole is not required, whereby corrosion resistance is not lowered and a decrease in cost can be achieved because a step of a drilling can be omitted.

Thus, the bolt for a truss of the present invention is extremely useful as a bolt for a truss by which the problems in the prior art can be solved.

We claim:

1. A bolt for a truss, the bolt comprising:
   a main body including:
      a head portion, and
      a shaft portion which extends from the head portion, the shaft portion having:
         a base portion with a polygonal cross-section at a head portion side of said shaft portion,
         a threaded portion extending from the base portion, and
         an annular external groove arranged between the base portion and the threaded portion;
   a polygonal tube having a polygonal cross-section, said polygonal tube being engaged with the shaft portion of the main body such that said polygonal tube is slideable and non-rotatable on said base portion; and
   a stopper for preventing release of the polygonal tube from the shaft portion, said stopper including a ring having a peripheral surface on which plural engaging protrusions are formed, the plural engaging protrusions being integratedly embedded in the annular groove.

* * * * *